United States Patent [19]

Kosuge

[11] 4,150,356

[45] Apr. 17, 1979

[54] INDICATION APPARATUS

[75] Inventor: Shuichi Kosuge, Nagoya, Japan

[73] Assignee: Nippondenso Co., Ltd., Kariya, Japan

[21] Appl. No.: 778,746

[22] Filed: Mar. 17, 1977

[30] Foreign Application Priority Data

Apr. 9, 1976 [JP] Japan .................................. 51/40653

[51] Int. Cl.² ............................................. G08B 19/00
[52] U.S. Cl. .................................. 340/52 F; 340/373;
340/378.5; 340/317
[58] Field of Search .................. 340/52 F, 324 R, 325,
340/213, 412, 413, 414, 378 MW, 378 R

[56] References Cited

U.S. PATENT DOCUMENTS

| | | | |
|---|---|---|---|
| 3,839,701 | 10/1974 | Pomerantz | 340/52 F |
| 3,987,439 | 10/1976 | Spaniola | 340/52 F |
| 4,034,336 | 7/1977 | Arai | 340/52 F |
| 4,034,369 | 7/1977 | Tanigawa | 340/52 F |

Primary Examiner—Harold I. Pitts

Attorney, Agent, or Firm—Cushman, Darby & Cushman

[57] ABSTRACT

An indication apparatus which detects a plurality of abnormal conditions occurring in a motor vehicle particularly in an automobile, and indicates an indicium corresponding to one of the abnormal conditions. When at least one of a plurality of sensors detects the occurrence of the plurality of abnormal conditions, a motor control circuit drives a motor whereby an indication drum coupled with the motor is also rotated so as to be stopped at a location for indicating the indicium corresponding to the detected abnormal condition. In order to investigate whether abnormal conditions other than the detected one have occurred or not, a switch for forcibly rotating the indication drum can be manually actuated so that the indication drum is further rotated so as to be stopped at a location for indicating another indicium corresponding to one of the other abnormal conditions and thus the other abnormal conditions are indicated successively.

7 Claims, 4 Drawing Figures

INDICATION APPARATUS

BACKGROUND OF THE INVENTION

The present invention relates to an indication apparatus of the drum type which comprises a plurality of sensors mounted on a motor vehicle and adapted to detect a plurality of abnormal conditions of the motor vehicle and an indication drum responsive to signals detected by the sensors for indicating a plurality of indicia corresponding to the signals.

With respect to the gauge panel in the cab of a motor vehicle, particularly of an automobile, an apparatus has been increasingly demanded which can provide in a narrow space much information required for safety driving.

SUMMARY OF THE INVENTION

An object of the present invention is to provide an indication apparatus of the drum type which can indicate a plurality of indicia in a narrow space.

The present invention has the effects that a plurality of indicia can be indicated in a narrow indication area, the control circuit means can be comparatively simplified and further a plurality of abnormal conditions corresponding to the plurality of indicia can be detected as desired by the operation of a switch for forcibly rotating the indication drum.

DESCRIPTION OF THE PREFERRED EMBODIMENT

Figure 1:
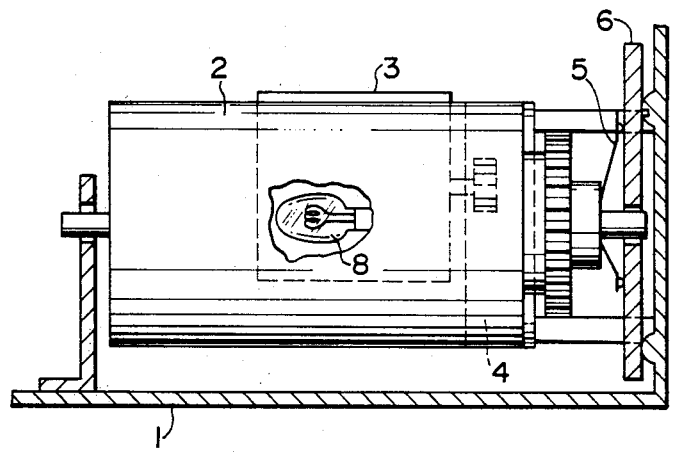
FIG. 1 and FIG. 2 are respectively front and side elevations illustrating generally the drum driving mechanism of an indication apparatus according to the present invention.
Figure 2:
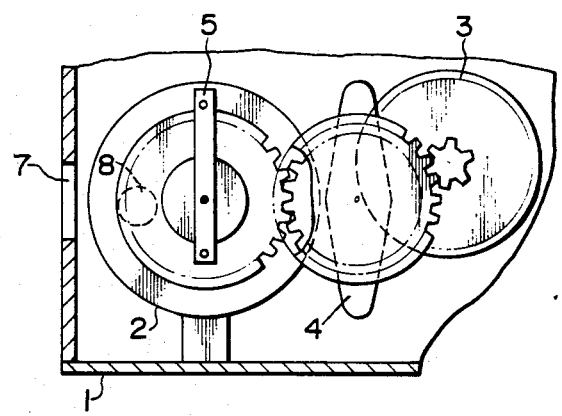
Figure 3:
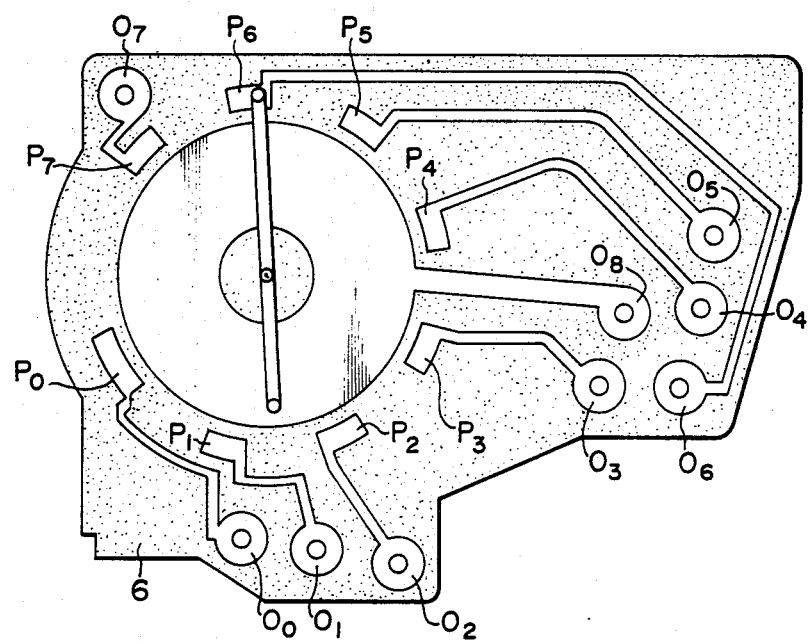
FIG. 3 is a detailed view of a printed board shown in FIG. 1.

In the following, the present invention will be described with respect to an embodiment shown in the drawings. FIG. 1 and FIG. 2 are respectively front and side elevations illustrating generally the drum driving mechanism of an indication apparatus according to the present invention. Reference numeral 1 designates the main body of a case of the indication apparatus which is provided, for example, on the gauge panel in the cab of a motor vehicle, numeral 2 an indication drum which has some desired indicia such as letters, designs, symbols or the like recorded on its outer surface, numeral 3 a d.c. motor which drives the indication drum 2 through a speed change gear mechanism 4, numeral 5 a movable contact which is rotated in a interlocking relation to the indication drum 2, numeral 6 a printed board on which a plurality of stationary contacts adapted to contact successively with the movable contact 5 are printed, and numeral 7 an indication window which is provided in an indication portion and through which indicia on the drum 2 are indicated by means of an illumination lamp 8. FIG. 3 is a detailed view of the printed board 6 shown in FIG. 1, on which stationary contacts P0 to P7 and output terminals 00 to 08 corresponding to the indicia on the indication drum are printed. The above-described constitution is so arranged that the angular position of the indication drum 2 is detected in accordance with the state of contact between the stationary contacts P0 to P7 and the movable contact 5 and controlled by a hereinafter described control circuit for indicating an appropriate indicium through the indication window 7.

The illuminating lamp 8 is arranged, as shown in FIG. 1 and FIG. 2, inside the indication drum 2 so that the semi-transparent indicia such as letters, symbols or the like recorded on the outer periphery of the drum 2 may be clearly indicated by light transmitted from the lamp 8 through the drum 2 only when the lamp 8 is turned on. Otherwise, the illuminating lamp 8 can be located outside the indication drum 2 so that the indicia may be illuminated by its reflective light.

Figure 4:
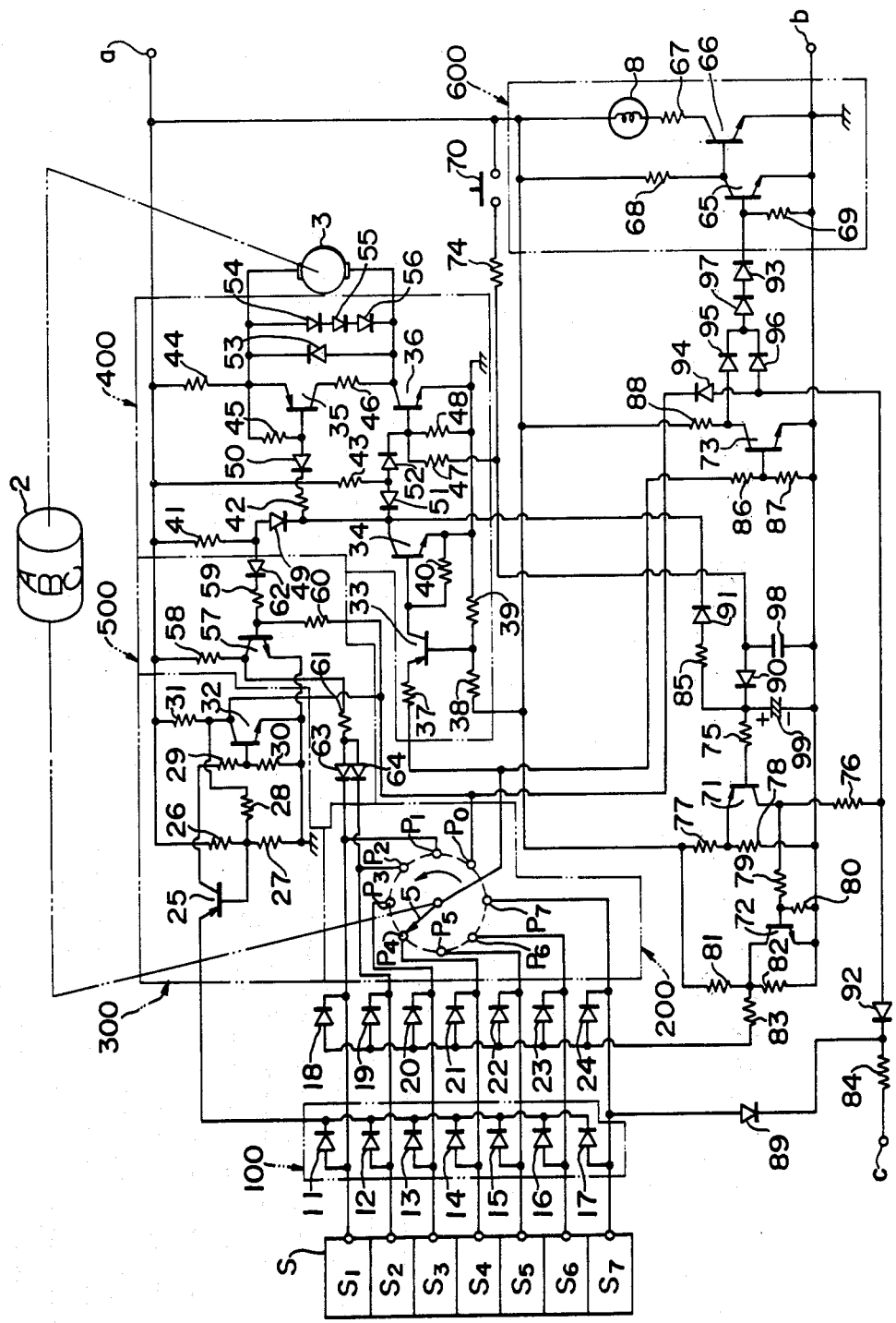
FIG. 4 is an electrical circuit diagram illustrating one embodiment of the control circuit of the indication apparatus according to the present invention.

Next, a control circuit in the indication apparatus according to the present invention will be described. FIG. 4 shows one embodiment of the control circuit. In FIG. 4, reference symbol a is the positive terminal of an electric source, symbol b is the negative terminal of the electric source, symbol c is a terminal which is to be connected with the negative terminal of the electric source upon engine start, and symbol S is a signal generating portion which includes sensor circuits S1 to S7 and detects various conditions of an automobile for generating detection signals. The storage battery of the vehicle is used as the electric source. The sensor circuits S1 to S7 are normally-closed or normally-opened sensors which provide high level signal outputs in response to abnormal conditions important for safety driving, for example, in the quantity of brake or engine oil, vacuum pressure, the specific weight of a battery liquid, the air pressure of a tire or the like.

Numeral 100 designates an OR circuit which includes diodes 11 to 17 for providing an OR output of the detection signals from the sensor circuits S1 to S7. Numeral 200 designates a rotary switch which, as shown concretely in FIG. 3, includes the stationary contacts P0 to P7 and the movable contact 5 interlocking with the indication drum 2. In particular, the stationary contacts P1 to P7 are connected with the output terminals of the sensor circuit S1 to S7, respectively, and the stationary contact P0 is a normal condition indicating contact on which is located the movable contact 5 when all the sensor circuits S1 to S7 do not detect any abnormal condition. Diodes 18 to 24 are connected between the OR circuit 100 and the rotary switch 200 to serve as input lines for raising the output levels of the stationary contacts P1 to P7, for example, in the case of checking. Numeral 300 designates a contact level control circuit which includes transistors 25 and 32 and resistors 26 to 31 for controlling the output level directed to the normal condition indicating contact P0 by means of the output from the OR circuit 100 and the contact level control circuit 300 is so arranged that the normal condition indicating contact P0 is supplied with the high level as a result of the transistors 25 and 32 being made non-conductive when the sensor circuits S1 to S7 do not detect any abnormal condition and thus all provide the high level outputs. Numeral 400 designates a motor control circuit for controlling the driving of the motor 3, which includes transistors 33, 34 and 35 being made conductive in response to the high level output from the movable contact 5, a transistor 36 being made conductive to drive the motor 3 when the transistors 33, 34 and 35 are non-conductive, resistors 37 to 48, diodes 49 to 52, a diode 53 for protecting the transistor 35, and diodes 54 to 56 for establishing a predetermined voltage. Numeral 500 is the main portion of a hold circuit, which includes a transistor 57, resistors 58 to 61, diodes 62, 63 and 64 and is so arranged that, when either one of the sensor circuits S1 and S2 supplies the high level output to cause the movable contact 5 to be contacted with the stationary contact P1 or P2, the transistors 33 and 34 are made conductive and, as a result, the transistor 57 is made non-conductive thereby to hold its collector voltage, that is, the output voltage of the contacts P1 or P2 at the high level. Numeral 600 designates an illuminating circuit which includes transistors 65 and 66, the lamp 8 for illuminating the indicia, and resistors 67, 68 and 69. Numeral 70 designates a forcibly actuatable switch which serves to energize forcibly the motor 3 for further checking other detection signals, numerals 71, 72 and 73 transistors, numerals 74 to 88 resistors, numerals 89 to 97 diodes, numeral 98 a noise preventing capacitor, and numeral 99 a timing capacitor. In particular, when the forcibly actuatable switch 70 is temporarily closed, the capacitor 99 is charged to make the transistors 71 and 72 non-coductive. Thus, the electric source voltage is divided by the resistors 81 and 82, and these divided voltages are supplied not only through the resistor 83 and the distributing diodes 18 to 24 to the stationary contacts P1 to P7 of the rotary switch 200 but also through the resistors 74 and 47 to the base of the transistor 36 in the motor control circuit 400 to make the transistor 36 conductive for driving forcibly the motor 3. In this case, these divided voltages are set to be lower than the base voltages of the transistors 25 and 33 which are determined by the resistors 26 and 27 and the resistors 38 and 39, respectively, and, as a result, the transistor 73 is conductive while the transistors 25 and 33 are non-conductive. Further, the lamp 8 in the illuminating circuit 600 is turned on only when both the inputs to the diodes 95 and 96 are at the low level.

There are provided seven indicia in this embodiment and thus the stationary contacts P1 to P7 and the indicia on the indication drum 2 are so located that, when the movable contact 5 is contacted with any one of the stationary contacts P1 to P7 respectively connected with the output terminals of the sensor circuits S1 to S7, the indicium corresponding to the stationary contact may be indicated through the indication window 7.

In the following, the operation of the above-described embodiment will be described. First of all, when the key switch is turned on by an operator, the source voltage is applied across the terminals a and b and the apparatus begins to perform the indication operation. When none of the sensor circuits S1 to S7 in the signal generating portion S provide a high level output indicative of the abnormal condition, the movable contact 5 rests on the stationary contact P0 which then provides the high level output to indicate a normal condition, and thus the motor 3 is not driven, the indication drum 2 is not rotated and the illumination lamp 8 is not turned on.

Next, if the sensor circuit S3, for example, in the signal generating portion S provides a high level signal, that is, a signal indicating the occurence of an abnormal condition, the OR circuit 100 provides the high level output so that the transistors 25 and 32 in the contact level control circuit 300 is made conductive thus causing the normal condition indicating contact P0 to be at the low level. As a result, the movable contact 5 which has been located at the stationary contact P0 supplies the low level to make the transistors 33 and 34 in the motor control circuit 400 non-conductive. Thus, the transistor 36 is supplied with the base current through the resistor 43 and the diode 52 so as to be made conductive for driving the motor 3. The rotation of the motor 3 causes the movable contact 5 to be rotated and, when the movable contact 5 contacts the stationary contact P3 to supply the high level output, the transistors 33 and 34 are made conductive and the transistor 36 is made non-conductive so that the motor 3 is stopped. On the other hand, the transistor 35 is supplied with its base current to be made conductive through the resistor 44, the diode 50, the resistor 42 and the transistor 34 and, as a result, both terminals of the motor are short-circuited through the resistor 46, that is, the motor 3 is strongly braked. Then, since the movable contact 5 is supplied with the high level output from the stationary contact P3 to make the transistor 73 conductive and the transistor 32 is conductive to maintain the normal condition indicating contact P0 to be at the low level, the preceding stage transistor 65 is made non-conductive while the following stage transistor 66 is made conductive thereby to turn on the illuminating lamp 8, and thus the indicium on the indication drum 2 corresponding to the sensor circuit S3 is indicated through the indication window.

Further, when it is to be investigated whether abnormal conditions corresponding to other indicia than the detected one occurs or not, the forcibly actuatable switch 70 can be closed for a definite time interval after the termination of the above-described indication operation. The closure of the switch 70 causes the capacitor 99 to be rapidly charged so that the transistors 71 and 72 are made non-conductive and the divided voltages resulting from the source voltage being divided through the resistors 81 and 82 are supplied through the resistor 83 and the diodes 18 to 24 to the respective stationary contacts P1 to P7. At the same time, the transistor 36 is supplied with its base current through the resistor 47 to be made conductive for rotating the motor 3. Thus, if the movable contact 5 is positioned to be disengaged from the high level stationary contact P3 when the forcibly actuatable switch 70 is opened, the transistor 36 remains conductive and can continue to rotate the motor 3 because the transistors 33 and 34 are then non-conductive.

Now, let the indicium corresponding to another abnormal condition be the sensor circuit S6. When the movable contact 5 is engaged with the stationary contact P6 having the high level output, the motor 3 stops its rotation as described above and turns on the illuminating lamp 8 so that the indicium corresponding to the sensor circuit S6 can be indicated. Then, the capacitor 99 discharges its charges through the transistor 34 to recover its original state. Although the stationary contacts P4 and P5 are applied with medium level voltages through the dividing resistors 81 and 82 when the movable contact 5 slides over the contacts P4 and P5, the transistor 37 remains non-conductive to rotate the motor 3 by its base voltage set through the resistors 38 and 39. However, since the transistor 73 is then sufficiently conductive, the illuminating circuit 600 is supplied with the low level so that the illuminating lamp 8 may be turned on only when the movable contact is in contact with the stationary contacts P4 and P5 and thus the respective indicia may be indicated.

On the other hand, when the forcibly actuatable switch 70 is closed, for example, at the beginning of vehicle driving, this apparatus can also be used to check the presence of abnormal conditions. If no abnormal condition has occurred, the movable contact 5 is brought into contact successively from the normal condition indicating stationary contact P0 through the stationary contacts P1 to P7 again to the stationary contact P0 so that all the indicia may be successively indicated.

Further, this apparatus has a holding function with respect to the items detected by the sensor circuits S1 and S2. Thus, when the movable contact 5 contacts either one of the stationary contacts P1 and P2 which supplies the high level output and stops for a moment, the transistors 33 and 34 are made conductive and the transistor 57 is made non-conductive. Thus, since the stationary contacts P1 and P2 are supplied with high level signals for its holding through the resistor 61 and the diodes 63 and 64, the motor 3 remains to stop at a position for continuing its holding operation as long as the source is not disconnected, even if the abnormal condition corresponding to the indicium has been eliminated. Accordingly, if this function is applied to the items of higher degree of danger, it can contribute very much to the safety drive of automobiles.

The terminal c which is connected at the time of engine starting with the negative terminal of the source b and may be the L terminal of the regulator, for example, serves to force through the diode 89 and the resistor 84 the sensor circuit S7 to the low level, even if it is raised to the high level due to malfunction, thereby to stop detection operation temporarily only at the time of engine starting. Thus, the terminal c is used for the sensor circuits when it is difficult to perform the normal detection operation such as at the time of engine starting. For example, since the battery voltage drops temporarily when the starter is in operation, the terminal c is used so that this voltage drop may not be detected as an abnormal condition.

Although the number of indicia or the items to be detected is seven in this embodiment, it is possible of course to increase or decrease the number as desired by changing the sensor circuits and the signal lines.

Further, although, in this embodiment, the sensor circuits S1 to S7 in the signal generating portion S are so constituted that high level signals are generated when some abnormal conditions are detected and the succeeding control circuit is operated appropriately on the basis of the high level signals, the sensor circuits S1 to S7 can be so constituted comparatively easily that the low level signals are generated when some abnormal conditions are detected and the succeeding control circuit is operated on the basis of the low level signals by inverting the polarity of the source, replacing pnp transistors by npn transistors, and inverting the direction of diodes or the like.

What is claimed is:

1. An indication apparatus for motor vehicles comprising:
   a battery;
   an electric motor energizable by said battery;
   an indication drum coupled to said electric motor and rotated thereby, said indication drum being recorded with a plurality of indicia which respectively correspond to a plurality of abnormal conditions of a motor vehicle;
   a plurality of sensors for respectively detecting the occurrence of said plurality of abnormal conditions of said motor vehicle;
   a switch having a movable contact and a plurality of stationary contacts, said movable contact being coupled to said indication drum and slidable over said plurality of stationary contacts in accordance with the rotation of said indication drum, and said plurality of stationary contacts being respectively connected to said plurality of sensors and applied with respective output signals therefrom;
   motor control circuit means, connected to said plurality of sensors and said movable contact of said switch, for starting to energize said electric motor when at least one output signal of said plurality of sensors is generated and stopping to energize the same when said movable contact comes into contact with the stationary contact which is applied with said output signal of said plurality of sensors, thereby causing said indication drum to indicate one of said indicia which corresponds to said output signal of said plurality of sensors; and
   hold circuit means, connected between said movable contact and some of said plurality of stationary contacts selected to be applied with output signals having higher importance than that of the others, for keeping application of said output signals having higher importance to said some of said stationary contacts, whereby indicating some of said plurality of abnormal conditions of higher importance is maintained and further indicating the others of said plurality of abnormal conditions of lower importance is stopped after said output signal of said plurality of sensors is extinguished.

2. An indication apparatus as set forth in claim 1 further comprising:
   a manually-actuatable switch for forcibly energizing said electric motor in a manner that a predetermined potential is supplied to said plurality of stationary contacts of said switch irrespectively of said output signals of said plurality of sensors.

3. An indication apparatus as set forth in claim 2 further comprising:
   a lamp positioned at said indication drum and energized while said movable contact is in contact with said plurality of stationary contacts.

4. An indication apparatus as set forth in claim 1 further comprising:
   means for prohibiting at least one of said output signals of said plurality of sensors from being applied to said plurality of stationary contacts only while said motor vehicle is in starting operation.

5. An indication apparatus as set forth in claim 4 wherein said prohibiting means comprises a diode.

6. An indication apparatus for motor vehicles comprising:
   a battery;
   an electric motor energizable by said battery;
   an indication drum coupled to said electric motor and rotated thereby, said indication drum being recorded with a plurality of indicia which respectively correspond to a plurality of abnormal conditions of a motor vehicle;
   a plurality of sensors for respectively detecting the occurrence of said plurality of abnormal conditions of said motor vehicle;
   a switch having a movable contact and a plurality of stationary contacts, said movable contact being coupled to said indication drum and slidable over said plurality of stationary contacts in accordance with the rotation of said indication drum, and said plurality of stationary contacts being respectively connected to said plurality of sensors and applied with respective output signals therefrom;

motor control circuit means, connected to said plurality of sensors and said movable contact of said switch, for starting to energize said electric motor when at least one output signal of said plurality of sensors is generated and stopping to energize the same when said movable contact comes into contact with the stationary contact which is applied with said output signal of said plurality of sensors, thereby causing said indication drum to indicate one of said indicia which corresponds to said output signal of said plurality of sensors; and a manually-actuatable switch for forcibly energizing said electric motor in a manner that a predetermined potential is supplied to said plurality of stationary contacts to said switch irrespective of said output signals of said plurality of sensors.

7. An indication apparatus for motor vehicles comprising:

a battery for providing electric energy;

an electric motor connected to said battery and energizable by said battery;

an indication drum coupled to said electric motor and rotated thereby, said indication drum being recorded with a plurality of indicia which respectively correspond to a plurality of abnormal conditions of a motor vehicle;

a plurality of sensors for respectively detecting the occurrence of said plurality of abnormal conditions of the motor vehicle;

OR circuit means connected to said plurality of sensors for providing an OR output;

a rotary switch having a movable contact and a plurality of stationary contacts, said movable contact being coupled to said indication drum and slidable over said plurality of stationary contacts in accordance with the rotation of said indication drum, and said plurality of stationary contacts being respectively connected to said plurality of sensors and applied with respective output signals therefrom;

contact level control circuit means connected to said OR circuit means for controlling the output level of a stationary contact of said rotary switch which contact indicates a normal condition of the vehicle;

motor control circuit means, connected to said plurality of sensors and said movable contact of said switch, for starting to energize said electric motor when at least one output signal of said plurality of sensors is generated and for stopping to energize the same when said movable contact comes into contact with the stationary contact which is applied with said output signal of said plurality of sensors, thereby causing said indication drum to indicate one of said indicia which corresponds to said output signal of said plurality of sensors;

hold circuit means, connected between said movable contact and some of said plurality of stationary contacts selected to be applied with output signals having higher importance than that of the others, for keeping application of said output signals having higher importance to some of said stationary contacts, whereby indicating some of said plurality of abnormal conditions of higher importance is maintained and further indicating the others of said plurality of abnormal conditions of lower importance is stopped after said output signal of said plurality of sensors is extinguished;

manually-actuatable switch means connected between said battery and said plurality of sensors for forcibly energizing said electric motor irrespectively of said output signals of said plurality of sensors;

lamp circuit means connected to said movable contact for illuminating one of said plurality of indicia while said movable contact is in contact with the corresponding one of said plurality of stationary contacts; and prohibit means connected to at least one of said plurality of sensors for prohibiting application of the output signal of said at least one of said sensors to said plurality of stationary contacts only while said motor vehicle is in starting operation.

* * * * *